United States Patent Office 2,714,821
Patented Aug. 9, 1955

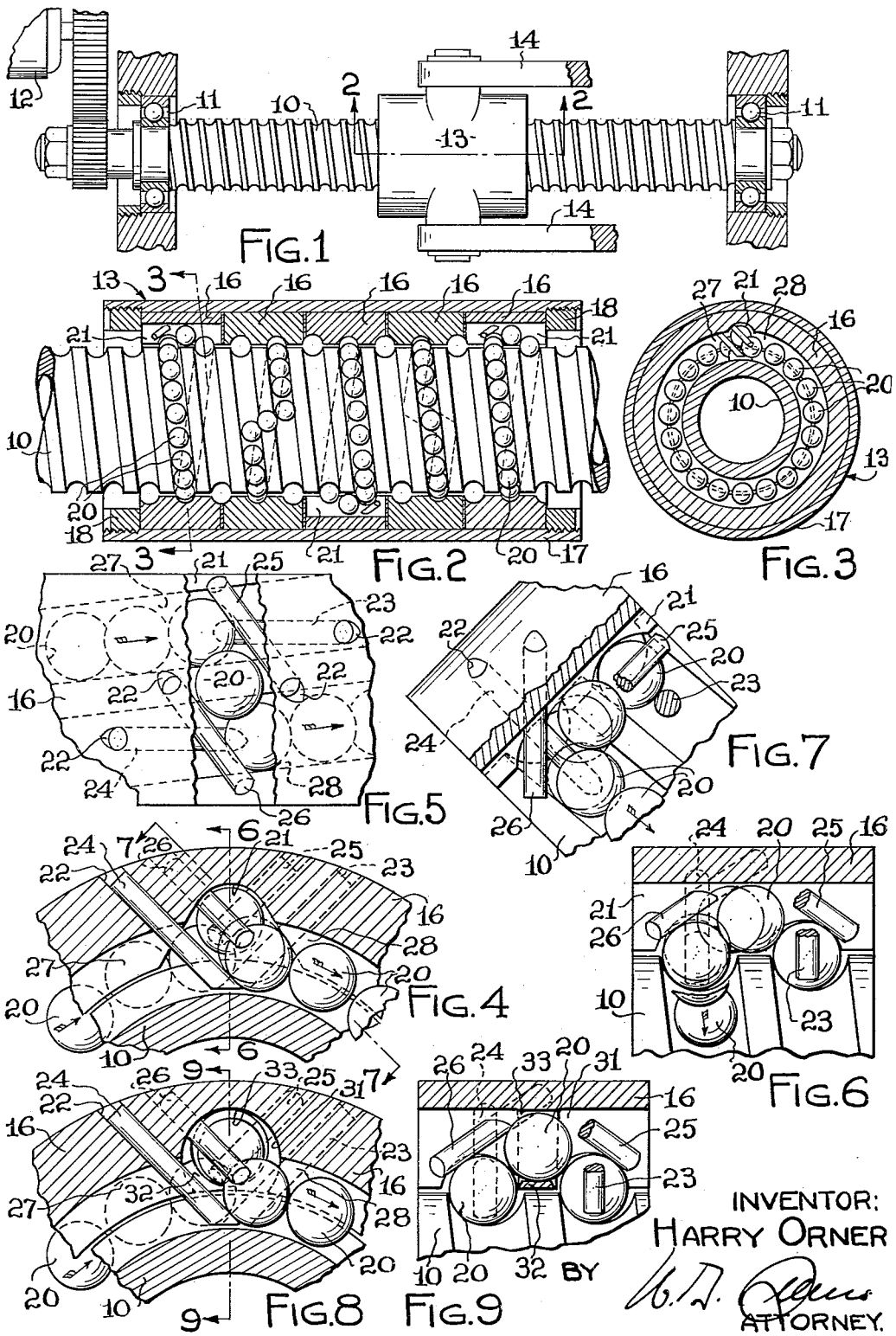
Aug. 9, 1955  H. ORNER  2,714,821
DEFLECTOR PIN CONSTRUCTION FOR BALL-BEARING
SCREW AND NUT MECHANISM
Filed June 4, 1954
INVENTOR:
HARRY ORNER
ATTORNEY.

2,714,821

DEFLECTOR PIN CONSTRUCTION FOR BALL-BEARING SCREW AND NUT MECHANISM

Harry Orner, Altadena, Calif.

Application June 4, 1954, Serial No. 434,541

9 Claims. (Cl. 74—459)

This invention relates to a ball-bearing screw and nut mechanism, and particularly to an improved deflector pin construction for shifting the balls over the crest of the screw thread from one end of a single turn of the helical ball race to the other end of the single turn. The application constitutes a continuation-in-part of my co-pending application Serial No. 371,253, filed July 30, 1953, for a Ball-Bearing Screw and Nut Mechanism.

Ball-bearing screw and nut mechanisms are widely used for a number of applications in which it is desired to transform rotary motion to linear motion, or vice versa. Such mechanisms conventionally comprise a helical ball race formed of a number of turns between the screw and nut, and an external tube for returning the balls from one end of the ball race to the other. The conventional constructions, however, are disadvantageous in that the external ball return tube is subject to breaking and bending. Furthermore, the relatively long ball return tube, whether external or internal, results in the creation of a large amount of friction or rubbing tending to hinder the ball movement, with consequent increase in the overall friction of the device.

The disadvantages of the external ball return tube, and other relatively long return passages, are eliminated in the structure described and claimed in my co-pending application cited above. The described structure incorporates a plurality of individual nuts each adapted to return the balls over the crest of the screw thread from one end of a single ball race turn to the other end thereof. By virtue of this construction in which each turn of the helix constitutes, in effect, a single ball race, there is no necessity for an external or long ball return tube, and the overall friction of the mechanism is greatly reduced. In Figures 9, 10, 11, 12 and 13 of my co-pending application, a particularly advantageous construction is illustrated in which each separate nut or nut segment is formed with a ball return bore, and pins are provided through the nut wall in order to block the ends of the bore and to guide the balls over the crest of the screw thread. This construction is extremely economical from a mass production standpoint since it eliminates the necessity for employing separate guide elements in the nut, specially formed liners, etc. Instead, it is merely necessary to drill or broach the nut, bore holes for the pins, and then press the pins into the holes. This provides a very economical overall structure which is not only more effective, but also much more inexpensive than conventional mechanisms of the type indicated above.

In the structure shown in Figures 9-13 of the co-pending application, the pin at each end of the bore served mainly to prevent the balls from running out of the nut, and had relatively little effect in guiding the balls over the crest of the screw thread. Furthermore, the balls when transferred over the screw thread crest were traveling substantially axially of the screw and nut, and therefore had to turn two substantially right-angled corners before proceeding from one end of the single turn to the other end thereof. The friction resulting from the absence of guides for the balls passing over the crest, and the inertia present when the balls turned the two right-angled corners, had the effect of increasing the overall friction and inertia as compared to the improved structure which constitutes the subject matter of the present application.

In view of the above factors characteristic of ball-bearing screw and nut mechanisms in general, and ball-bearing screw and nut mechanisms of the type in which the balls are returned over a single crest of the screw thread as described in my co-pending application in particular, it is an object of the present invention to provide an improved deflector pin arrangement by which the pin blocking the end of the nut bore serves the additional purpose of providing a transfer race for the balls, the pin being disposed to reduce the friction created when the balls pass over the thread crest from one end of the single helix turn to the other.

A further object of the invention is to provide a deflector pin construction and arrangement such that the balls are not caused to turn right-angled corners when passing over the screw thread crest, but instead travel in a general forward or oblique direction so that the friction and inertia inherent in the ball transfer operation are reduced.

A further object of the invention is to provide a pair of pins at each end of the single turn of the helical ball race, said pins being so arranged that they cross over each other and cooperate to provide a transfer race such that the balls are transferred over the crest of the screw thread in a substantially frictionless manner.

These and other objects and advantages of the invention will be more fully set forth in the following specification and claims considered in connection with the attached drawing to which they relate:

In the drawing:

Figure 1 is a plan view showing a typical use of the ball-bearing screw and nut mechanism;

Figure 2 is an enlarged longitudinal central sectional view taken on line 2—2 of Figure 1;

Figure 3 is a transverse sectional view taken on the broken line 3—3 of Figure 2;

Figure 4 is an enlarged fragmentary sectional view of the ball return or transfer port portion illustrated in Figure 3;

Figure 5 is a top plan view of the showing of Figure 4, portions of the external nut wall being broken away to illustrate the balls as they are transferred from one end of the single helical race turn to the other end thereof;

Figure 6 is a fragmentary longitudinal section on line 6—6 of Figure 4;

Figure 7 is an oblique section on line 7—7 of Figure 4;

Figure 8 corresponds generally to Figure 4 but illustrates a second embodiment of the invention in which the balls are not exposed to the crest of the screw thread but instead pass through a port formed entirely in the nut; and Figure 9 is a section along line 9—9 of Figure 8.

Referring to the drawing, and particularly to Figure 1, the apparatus is shown as comprising a screw 10 journaled in ball-bearings 11 and driven through suitable gearing by an electric motor indicated at 12. Mounted on the screw 10 is a ball-bearing nut mechanism 13 constructed in accordance with the present invention and connected through pivoted arms 14 to a device, such as an airplane landing gear, not shown, which it is desired to shift linearly. The construction is such that rotation of screw 10 by motor 12 effects linear movement of nut mechanism 13 and thus of the device driven through arms 14. Referring to Figure 2, the nut mechanism 13 is shown as comprising a plurality of axially adjacent annular nuts or nut segments 16 mounted within a retaining sleeve 17 and held against relative axial displacement by end rings 18, the latter being threadedly inserted into the sleeve ends. Any number of nuts 16, from one to a large number, may be employed, depending upon the design requirements of the particular screw and nut system. The nuts 16 being identical, only the one to the left in Figure 2 will be described and with particular reference to Figures 3–7.

Each nut 16 is formed with an internal helical groove corresponding to the external groove on screw 10 and mating therewith to form a helical race for a plurality of balls 20. The balls 20 are only mounted in a single turn of the race, the end portions of the turn being located at a bore or internal channel 21 which is formed in nut 16 and extends generally axially thereof. In the embodiment of the invention shown in Figures 2–7, the bore or channel 21 is open throughout its length to the screw 10, and serves as a passage through which the balls 20 are transferred over a crest of the thread on screw 10 from one end of the single ball race turn to the other. As shown in Figure 4, bore 21 is preferably of general U or V-section, having a rounded portion at its bottom, corresponding to the curvature of balls 20, and a wide portion at its mouth which is located relatively adjacent screw 10.

According to the present invention, a first pair of pins 23 and 24, and a second pair of pins 25 and 26, are mounted through the wall of nut 16 at bore or channel 21 for the purpose of providing a transfer race for the balls 20 as they shift over the thread crest from one end of the helical race turn to the other. All of the pins 23—26 are inserted through bored holes 22 in the body of nut 16, and are preferably retained through use of press-fit principles, although welding, brazing or soldering may be employed if desired. The use of inserted pins 23—26, and the use of channel 21 which may be economically drilled or broached, greatly facilitate the mass production of the screw and nut mechanism. This is because it is unnecessary to employ special liners, pockets, deflector blocks, etc. The speed of manufacture is thus increased and the cost reduced without impairing the quality of the resulting article.

Referring to Figure 5, let it be assumed that the screw 10 is being turned in such a direction, relative to nut 16, that balls 20 are traveling to the right as shown by the arrows. The pins 23 and 25 then cooperate to lift and deflect the balls 20 out of one end 27 of the single turn of the helical race and into the bore or channel 21. Pins 24 and 26 then cooperate to deflect the balls 20 out of the bore and into the other end 28 of the single turn. Opposite movement of the balls 20, and thus reverse pin operation, occurs when the relative rotation between the screw and nut is reversed, but the following description will be based upon the assumption that the ball movement is as indicated by the arrows.

Stated generally, the pins 23 and 24 of the first pair are disposed, respectively, to raise and lower the balls 20 out of one end 27 of the helix turn and into the other end 28. The pins 25 and 26 of the second pair are disposed not only to block the ends of the bore 21, so that the balls may not roll out of place, but also to serve as guides or races for the balls 20 while they are rolling through the transfer channel. The pins 25 and 26 cross over the associated pins 23 and 24 and are disposed (Figure 5) generally oblique to the longitudinal axis of the screw, the arrangement being such that the balls 20 travel generally forwardly and obliquely to the bore 21. The balls 20, therefore, need only turn at obtuse angles as they are lifted out of one end of the helix turn and at obtuse angles as they pass into the other end of the turn, thereby resulting in a reduction in inertia and friction as compared to constructions in which the balls must turn two right-angled corners. Because of the arrangement of pins 25 and 26, right-angled turns are avoided in spite of the fact that bore 21 is itself axial to the nut and therefore may be formed very simply and economically.

According to a more specific description of the pin arrangement, the first pairs of pins 23 and 24 are disposed in parallel planes which are spaced from each other a distance substantially equal to the lead of the helix turns. The parallel planes are perpendicular to the axis of the nut and screw, and in the illustrated embodiment are perpendicular to the bore 21 which is shown as extending axially of the nut. Each pin 23 or 24 inclines outwardly from the associated end 27 or 28 of the single turn of the helical race, so that the pin 23 will serve to scoop the balls 20 out of turn end 27 while the pin 24 will serve as an incline down which the balls roll into turn end 28. The inner portion of each pin 23 or 24 is preferably beveled (Figure 4) to fit closely adjacent, but out of contact with, the root of the screw threads, and is disposed radially inwardly of the bore or channel 21. The outer portion of each pin 23 or 24 is located on the side of the bore 21 remote from the associated turn end 27 or 28. The pins 23 and 24 may be seen upon reference to Figure 4 to lie at right angles to each other, with their inner ends lying on a line disposed radially inwardly of the exact center of bore 21 and parallel thereto.

The pins 25 and 26 of the second pair are disposed, as shown in Figure 5, in spaced parallel planes which are transverse or oblique to the screw and nut axis, the spacing between the planes being somewhat greater than the diameter of a ball 20. The inner portion of each pin 25 or 26 crosses over the inner end of the corresponding pin 23 or 24 and serves to block the end of bore 21, so that the balls 20 may not roll out of the bore. With a nut 16 having the illustrated wall thickness, the outer portion of each pin 25 or 26 is disposed generally midway between the ends 27 and 28 of the helix turn, so that the pins penetrate bore 21 intermediate turn ends 27 and 28 as shown in Figure 6. The innermost ends of pins 25 and 26, which are disposed in bore 21 axially outwardly of the ends 27 and 28 of the helix turn, need not be beveled since they are never contacted by balls 20.

As previously indicated, the parallel planes containing pins 25 and 26 are oblique to the common axis of the nut 16 and screw 10, in such a way that the progress of the balls through bore 21 is at an obtuse angle to their progress through helix turn ends 27 and 28, as distinguished from a right angle thereto. Because of the positioning of pins 25 and 26, the balls 20 do not travel longitudinally of the bore 21 but instead travel forwardly at an oblique angle thereto, so that the balls shift from the left to the right side of bore 21 as viewed in Figure 5. The side walls of channel 21 aid the pins in guiding the balls over the screw thread crest, the V or U construction of the channel being important in this respect as shown in Figure 4.

Referring next to the second embodiment of the invention, shown in Figures 8 and 9, the pin structure is the same and the reference numerals have been retained for corresponding parts. V-shaped bore or channel 21, however, has been replaced by a generally cylindrical bore 31 which is only open to turn ends 27 and 28 and is not open to the thread crest disposed between. Instead, a bridge portion 32 of nut 16 is provided over the thread crest, as best shown in Figure 9, the construction of the bridge being such that the balls 20 must pass through a circular port 33 having a diameter somewhat less than the diameter of bore 31. The port 33 is not concentric with bore 31, the center of the former being disposed substantially above the center of the latter.

In the operation of the form of the invention illustrated in Figures 3–7, and assuming that the balls are moving to the right as indicated by the arrows in Figure 5, the inner end of pin 23 operates to scoop a ball 20 out of helix turn end 27, and the ball rides not only on the pin 23 but also on pin 25 which serves to deflect it laterally into bore or channel 21. The ball then moves obliquely to the channel and over the crest of the screw thread, and is guided downwardly and into helix turn end 28 by the combined effects of pins 24 and 25. Because of the described arrangement and location of pins 25 and 26, the transfer of balls 20 from turn end 27 to end 28 is extremely smooth and relatively free of inertia as compared to former structures. The operation is the same when the direction of the ball movement is reversed, except that the pins 24 and 26 then serve to deflect the balls 20 into the channel 21 and the pins 23 and 25 serve to deflect the balls out of the channel. In either event, the guiding of the balls through the channel is effected not only by the pins 25 and 26 but also by the channel walls, as shown in Figure 6, the channel walls being of the previously described inverted V construction in order to effect the desired guiding action.

The operation of the form of the invention shown in Figures 8 and 9 is substantially the same as that described above in connection with the embodiment shown in Figures 3–7, except that the pins operate to guide the balls 20 through port 33. In this embodiment, therefore, the balls do not roll over the screw thread crest and in contact therewith, as in the previous embodiment, but instead roll over the bridge 32 which defines the bottom of the transfer port. It is important to note, as shown in Figure 9, that the thickness and axial position of bridge 32 are such that its side edges are approximately at the same axial positions as the points where pins 25 and 26 penetrate the bore. These pins therefore guide the balls through the port without permitting their contact with the vertical bridge edges shown in dashed lines in Figure 9.

The pins 23—26 are preferably cylindrical in shape and solid, as illustrated in the drawing. They may, however, be non-cylindrical, tubular, or of any construction suitable for effecting the desired ball deflection.

While the particular device herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A ball bearing screw and nut mechanism, comprising a screw having an external helical groove, a nut formed with a corresponding internal helical groove, said grooves mating with each other to form a helical ball race, a plurality of balls mounted in a single turn of said race, a conduit formed generally longitudinally in said nut at the ends of said single turn, said conduit being open, at least at its ends, to said ends of said single turn, and two pairs of deflector pins mounted in said nut at said conduit one pair opposite each end of said single turn, one pin of each of said pairs being disposed to elevate said balls out of said groove in said screw, the other pin of each of said pairs being disposed to be contacted by said balls along a substantial proportion of its length and to guide said balls through said conduit from one end of said single turn to the other end thereof.

2. The invention as claimed in claim 1, in which said other pin of each of said pairs crosses over said one pin thereof, and is disposed to block an end of said conduit.

3. The invention as claimed in claim 1, in which said pins are cylindrical and are press fitted through corresponding bores in said nut.

4. The invention as claimed in claim 1, in which said conduit is open throughout its length to said screw, so that said balls move through said conduit in contact with the crest of the thread of said screw.

5. The invention as claimed in claim 1, in which a bridge is provided intermediate the ends of said conduit radially outwardly of the crest of the thread of said screw, said bridge forming one wall of a port through which said balls must pass, out of contact with said crest, between the ends of said single turn of said race.

6. A ball bearing screw and nut mechanism, comprising a screw having an external helical groove, a nut formed with a corresponding internal helical groove, said grooves mating with each other to form a helical ball race, a plurality of balls mounted in a single turn of said race, a bore in said nut and extending parallel to the axis thereof, said bore being open, at least at its ends, to the ends of said single turn of said race, a first pair of pins mounted in the wall of said nut and disposed in spaced generally parallel planes which are transverse to the axis of said nut and screw, the pins of said first pair inclining outwardly from opposite ends of said single turn, each of the pins of said first pair having an inner portion located radially inwardly of said bore adjacent the root of the thread of said screw and an outer portion located on the opposite side of said bore from the associated end of said single turn, a second pair of pins mounted in the wall of said nut and disposed in spaced generally parallel planes which are oblique to said bore, each of the pins of said second pair having an inner end portion which crosses over the inner end portion of the associated pin of said first pair and which blocks one end of said bore, and also having an outer end portion disposed intermediate the ends of said single turn.

7. The invention as claimed in claim 6, in which said planes containing said second pair of pins are so disposed that said balls are deflected forwardly at an obtuse angle to the end portions of said single turn.

8. The invention as claimed in claim 7, in which said second pair of pins are disposed to guide said balls obliquely of said bore from the side thereof adjacent one end portion of said single turn, to the side adjacent the other end portion of said single turn.

9. The invention as claimed in claim 6, in which said bore is open throughout its length to said screw, and is of general V-section with a rounded bottom remote from said screw and a wide mouth adjacent said screw.

No references cited.